United States Patent
Akahori et al.

(10) Patent No.: US 7,914,300 B2
(45) Date of Patent: Mar. 29, 2011

(54) TERMINAL MOUNTING STRUCTURE IN ELECTRICAL JUNCTION BOX

(75) Inventors: Masahiro Akahori, Shizuoka (JP); Masatoshi Egawa, Shizuoka (JP); Hiroyuki Wakamatsu, Aichi (JP); Yousuke Okamoto, Aichi (JP); Makoto Sunohara, Aichi (JP); Masahiro Komuro, Aichi (JP)

(73) Assignee: Toyota Auto Body Co., Ltd., Kariya-shi (JP)

( * ) Notice: Subject to any disclaimer, the term of this patent is extended or adjusted under 35 U.S.C. 154(b) by 0 days.

(21) Appl. No.: 12/866,816

(22) PCT Filed: Jun. 1, 2009

(86) PCT No.: PCT/JP2009/059970
§ 371 (c)(1), (2), (4) Date: Aug. 9, 2010

(87) PCT Pub. No.: WO2010/007832
PCT Pub. Date: Jan. 21, 2010

(65) Prior Publication Data
US 2011/0003517 A1 Jan. 6, 2011

(30) Foreign Application Priority Data
Jul. 16, 2008 (JP) .................. 2008-184692

(51) Int. Cl.
*H01R 12/00* (2006.01)
(52) U.S. Cl. ..................... 439/76.2
(58) Field of Classification Search .............. 439/76.2
See application file for complete search history.

(56) References Cited

U.S. PATENT DOCUMENTS

| 6,053,780 A * | 4/2000 | Ono et al. ............. 439/810 |
| 7,442,099 B2 * | 10/2008 | Egawa et al. ......... 439/76.2 |
| 7,611,360 B2 * | 11/2009 | Akahori et al. ....... 439/76.2 |

FOREIGN PATENT DOCUMENTS

| JP | 10-172633 | 6/1998 |
| JP | 11-213855 | 8/1999 |
| JP | 2002-184299 A1 | 6/2002 |
| JP | 2006-4733 A1 | 1/2006 |

OTHER PUBLICATIONS

International Search Report for International Application No. PCT/JP2009/059970 dated Jun. 15, 2009.

* cited by examiner

*Primary Examiner* — Briggitte R Hammond
(74) *Attorney, Agent, or Firm* — Kratz, Quintos & Hanson, LLP (57) ABSTRACT

A structure for screw-tightening and connecting a terminal to an electrical junction box is provided. The terminal mounting structure in the electrical junction box ensures mounting operation with an insertion direction of the terminal obliquely oriented, and prevents heating of the terminal due to power supply. The terminal is secured and connected to a busbar of the junction box by a bolt, with a head and a shaft of the bolt inserted into a vertical opening and a horizontal notched hole of the terminal, respectively. A pair of opposed guiding walls are provided on a junction box body at both sides of the bolt. The guiding wall includes an entrance's side sloping surface obliquely extending from top to bottom, and a straight horizontal surface continuing to the sloping surface. The terminal includes a pair of outward projecting pieces at an upper portion to be slid on the sloping surface and the horizontal surface. A heat release portion extends integrally at an upper portion of a vertical plate portion of the terminal having the vertical opening. Linear indentations are provided on front and back surfaces of the heat release portion to be exposed outside.

2 Claims, 5 Drawing Sheets

TERMINAL MOUNTING STRUCTURE IN ELECTRICAL JUNCTION BOX

TECHNICAL FIELD

The present invention relates to a terminal mounting structure in an electrical junction box in which a terminal with an electric wire for power supply or other purposes is secured by a bolt and connected to a bus bar of the electrical junction box.

BACKGROUND ART

Figure 7A:
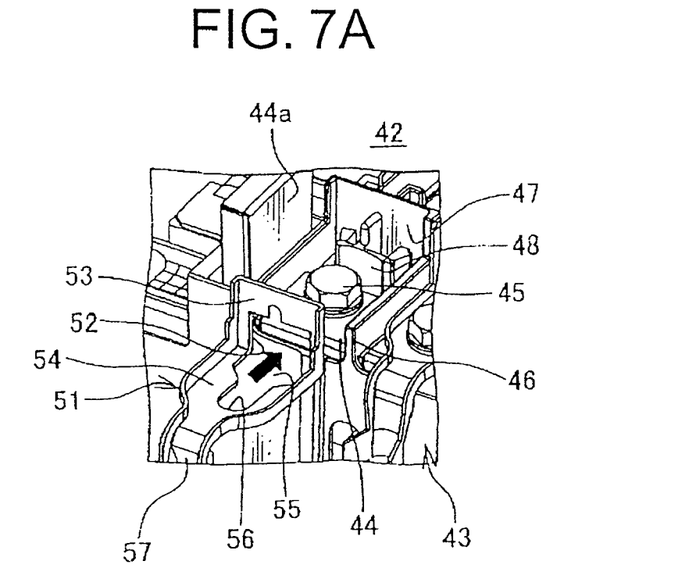
FIGS. 7A and 7B are an exploded perspective view of the terminal in its yet-to-be-mounted state, and a perspective view of the terminal in its mounted state in an exemplary conventional terminal mounting structure of an electrical junction box, respectively.
Figure 7B:
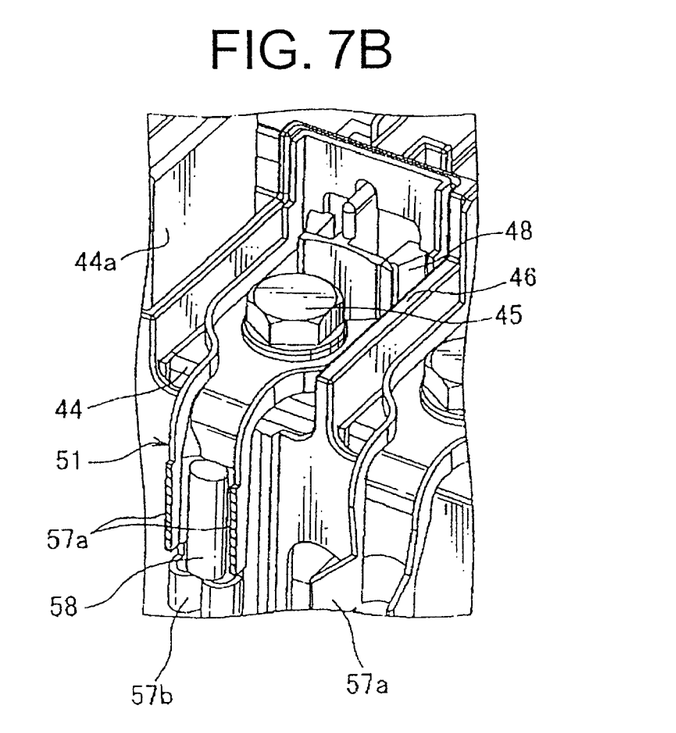

FIGS. 7A and 7B illustrate an example of a conventional terminal mounting structure in an electrical junction box (examples similar to the illustrated one can be found, for example, in the patent literatures PTL 1 and PTL 2).

This structure is configured to secure and connect a so-called inclined tightening preventive terminal 51 to a bus bar 44 of the electrical junction box (relay block) 42 by means of a bolt 45, the inclined tightening preventive terminal 51 being made of electrically conductive metal and bent substantially in a crank shape in plan view, and the bus bar 44 being in a shape of an electrically conductive metal plate. The electrical junction box 42 is incorporated in an automobile.

The terminal 51 includes a vertical plate portion 53 extending upward. The vertical plate portion 53 includes a rectangular opening 52 constructed to pass a head of the bolt 45 therethorough. The opening 52 communicates, via the opening 55 of the horizontal plate portion 54, with a U-shaped notched hole 56. A shaft of the bolt 45 is inserted into and passed through the notched hole 56. The horizontal plate portion 54 continues to a wire-connecting-plate portion 57 oriented downward. Right and left (a pair of) press-fit pieces 57a of the wire-connecting-plate portion 57 (partly shown) is press-fitted and connected to a conductor portion of an electric wire 58 for power supply or other purposes. Lower-side right and left (a pair of) narrow press-fit pieces 57b are press-fitted and secured to an insulating sheath of the electric wire 58. Reinforcement ribs upstand from both edges of each of the plate portions 53, 54, 57.

The electrical junction box 42 includes: a junction box body 43 made of insulating resin; a bus bar 44 arranged along the junction box body 43; a nut (not shown) arranged at a lower side of a bolt insertion hole of a horizontal plate portion (also represented by the reference sign 44) of the bus bar 44 within the junction box body, the nut being screwed onto the shaft of the bolt; a pair of partition walls 46 integrally upstanding from the junction box body 43 at both sides of the horizontal plate portion; an inlying vertical wall portion 47 connecting the pair of partition walls 46 to each other to constitute a peripheral wall which is U-shaped in plan view; and a resilient terminal locking portion 48 arranged in front of the wall portion 47.

The terminal 51 is inserted horizontally into a partition wall 46. The head of the bolt 45 in the state of provisional locking passes through an opening 52 on the front side. The shaft of the bolt 45 is inserted into the notched hole 56. The upstanding portion on the both sides of the vertical plate portion 53 is brought into locking with the locking portion 48 and the bolt 45 is brought into a state of complete fastening, and the horizontal plate portion 54 is brought into intimate connection to the horizontal portion of the bus bar 44.

In FIG. 7, the reference sign 44a indicates a vertical portion of the bus bar 44 for use in connecting a booster cable (not shown) thereto in a case where a battery is dead. The terminals 51 are arranged in two rows, the terminals belonging to one of the two rows are connected to a battery and the terminals belonging to the other of the two rows are connected to an alternator. The bus bar 44 is connected to the both terminals 51.

CITATION LIST

Patent Literature

PTL 1: Japanese Patent Application Laid-Open Publication No. 2006-4733
PTL 2: Japanese Patent Application Laid-Open Publication No. H11-213855

SUMMARY OF THE INVENTION

Technical Problem

However, in the case of the above-described conventional terminal mounting structure in the electrical junction box, in a case where the electrical junction box is arranged at a less elevated space in a vehicle and the terminal is to be inserted into the bolt from above and obliquely downward, it may be difficult to smartly bring the terminal into engagement with the bolt, and understandably assembling performance of the terminal to the electrical junction box leaves much to be improved.

Also, since a terminal connected to a power source may subjected to a high temperature, the wire-connecting portion of the terminal may experience loosening in its press-fitting. In such a case, contact resistance between the terminal and the electric wire increases and the temperature of the terminal may rise further and the reliability of the electric wire connection may be degraded.

In view of the above-identified drawbacks, an object of the present invention is, in a structure for screw-tightening and connecting a terminal for power supply or other purposes to an electrical junction box, to provide a terminal mounting structure in the electrical junction box that is capable of allowing smooth assembling operation even when an insertion direction of the terminal is obliquely oriented, and, in addition to this, capable of suppressing heating of the terminal due to power supply and increasing reliability of connection of the electric wire, and, as a whole, capable of increasing attachability of the so-called inclined tightening preventive terminal in the electrical junction box.

Solution to Problem

In order to attain the above objective, the invention according to a first aspect of the present invention is a terminal mounting structure in an electrical junction box for mounting a terminal on the electrical junction box, the terminal being secured and connected via a bolt to a bus bar of the electrical junction box, the terminal having a vertical opening into which a head of the bolt is inserted and passed therethrough, and the terminal having a horizontal notched hole into which a shaft of the bolt is inserted, the terminal mounting structure comprising: a pair of guiding walls provided on a junction box body, the guiding walls being opposed to each other and provided on both sides of the bolt, the guiding walls each having an entrance-side sloping surface, the sloping surface sloping from a top to a bottom of the guiding walls, and the guiding walls each having a straight horizontal surface continuing to the sloping surface, and the terminal having a pair of projecting pieces outwardly extending and configured to be slid on the sloping surface and then on the horizontal surface.

With the construction described above, the terminal is inserted into a space under the pair of guiding walls obliquely from above and obliquely downward, and the pair of projecting pieces of the terminal are slid on and guided by the entrance's side sloping surface of the pair of guiding walls, and subsequently, the pair of projecting pieces are horizontally slid along and guided by the straight horizontal surface. The pair of projecting pieces also have the effect of releasing the heat of the terminal to outside.

The terminal mounting structure for the electrical junction box according to a second aspect of the present invention is the terminal mounting structure of the first aspect, further comprising a heat release portion is provided in one piece with an upper portion of the vertical plate portion of the terminal having the vertical opening, a plurality of linear indentations are provided on a front surface and a rear surface of the heat release portion, and the front surface and the rear surface of the heat release portion are exposed to outside.

With the construction described above, when power distribution is made in the terminal for power supply or other purposes, the terminal may be heated causing undesirable effects upon the wire-connecting portion of the electric wire, in response to which the heat of the terminal is released via the wide heat release portion to the outside, and further, the linear indentations on the front and back surface of the heat release portion increases the surface area of the heat release portion, so that the heat release effect is promoted. The pair of projecting pieces also have the effect of releasing the heat of the terminal to the outside.

Advantageous Effects of the Invention

According to the invention of the first aspect, even when the electrical junction box is arranged at a less elevated space in the vehicle and as a result it is difficult to horizontally assemble the terminal to the electrical junction box, the terminal can be inserted obliquely from above, and the pair of projecting pieces of the terminal are smoothly inserted along the inlying straight horizontal surface via the entrance's side sloping surface of the pair of guiding walls, and accordingly assembling operation of the terminal to the electrical junction box can be performed smoothly and effectively. Thus, the attachability of the so-called inclined tightening preventive terminal in the electrical junction box can be improved. Also, the pair of projecting pieces release the heat of the terminal to the outside, and thus, for example, loosening of the wide crimping portion of the terminal is prevented, so that the reliability of electrical connection with the electric wire and the reliability of power supply are improved.

According to the invention of the second aspect, the heat generated in the terminal for power supply or other purposes is released from the front and back surfaces of the heat release portion to the outside, and the linear indentations on the front and back surfaces increases the surface area of the front and back surfaces to promote the heat release effect, so that the temperature of the terminal is decreased, and, for example, loosening of the wide crimping portion of the terminal is prevented, so that the reliability of electrical connection with the electric wire and the reliability of power supply are improved. Thus, the attachability of the so-called inclined tightening preventive terminal in the electrical junction box can be enhanced. The pair of projecting piece releases the heat of the terminal to the outside, and understandably the above effects are further increased.

REFERENCE NUMERALS 1, 31 Terminal
3, 30 Projecting piece
5, 42 Electrical junction box
6 Junction box body
8, 35 Opening
11, 38 Notched hole
18, 49 Guiding wall
18a Sloping surface
18b Horizontal surface
20, 45 Bolt
21, 44 Bus bar
32 Vertical plate portion
33 Heat release portion
34 Indentations

DESCRIPTION OF EMBODIMENTS

FIGS. 1 to 4 illustrate a terminal mounting structure for mounting a terminal on an electrical junction box according to a first embodiment of the present invention.

Figure 1:
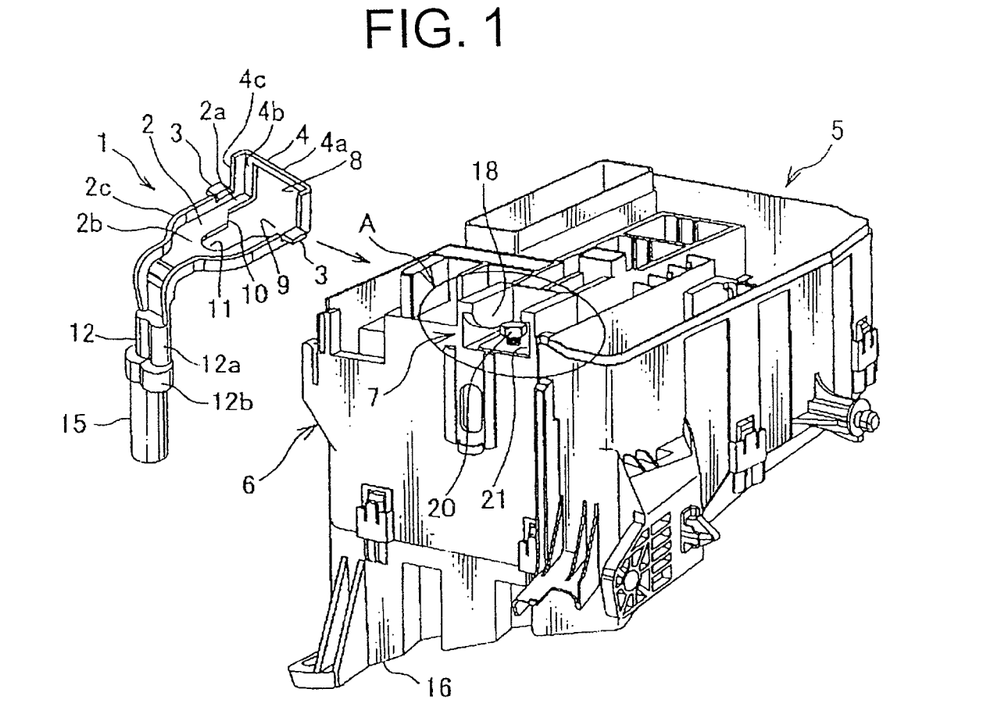
FIG. 1 is an exploded perspective view of a terminal mounting structure in an electrical junction box according to one embodiment of the present invention.
Figure 2:
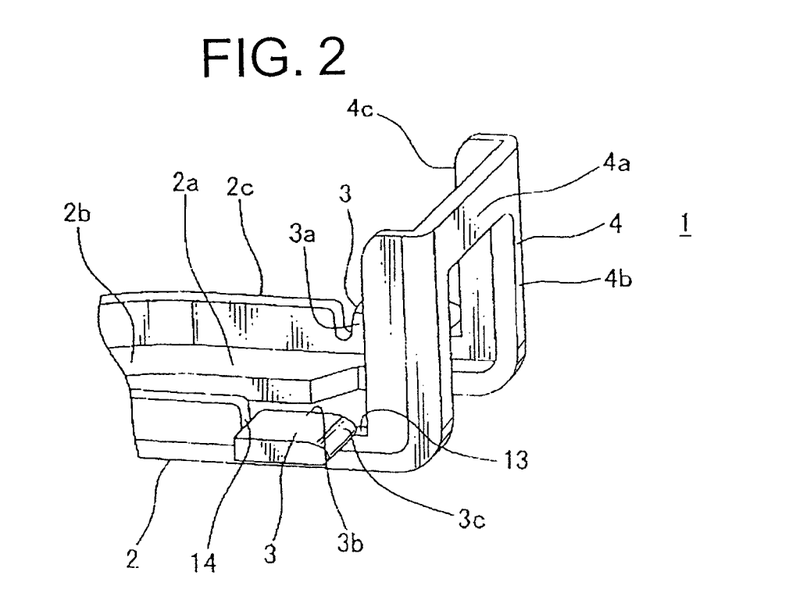
FIG. 2 is a perspective view of a principal portion of a terminal.
Figure 3A:
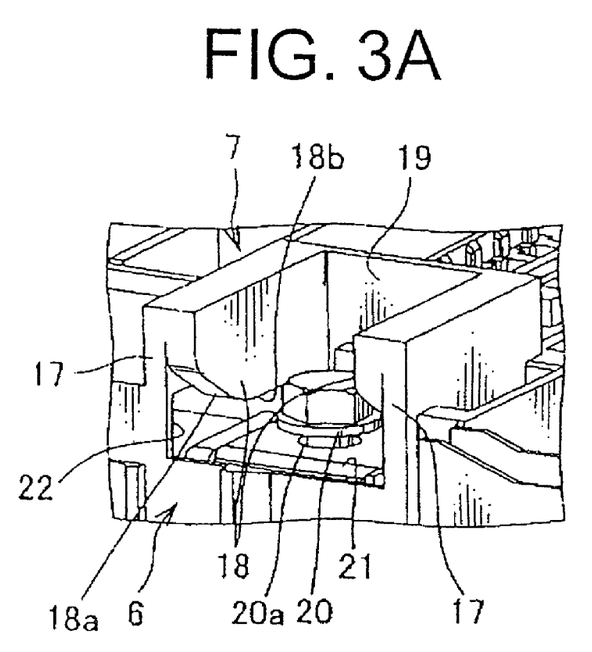
FIGS. 3A and 3B are an enlarged perspective view of a principal portion A in FIG. 1, and a side view of an inner portion of the same principal portion A, respectively.
Figure 3B:
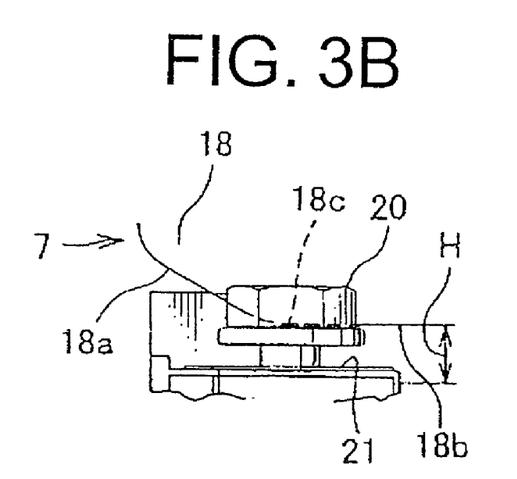

This structure, as shown in FIGS. 1 and 2, includes a pair of horizontal projecting pieces 3 provided at both sides of a horizontal plate portion 2 of a terminal 1, the projecting pieces 3 being in one piece with the horizontal plate portion 2. Also, as shown in FIGS. 1 and 3, the structure includes a guiding portion 7 adapted to guide the pair of projecting pieces 3 of the terminal 1 into a junction box body 6 of an electrical junction box 5, the projecting pieces 3 being guided obliquely downward with respect to the junction box body 6, the junction box body 6 being made of insulating resin, and the guiding portion 7 being in one piece with the junction box body 6.

In FIG. 1, for convenience of explanation, there is shown the terminal 1 with more enlarged size than that of the actual terminal 1 relative to the electrical junction box 5.

The terminal 1 comprises: a vertical plate portion 4 having a vertical, wide, rectangular opening 8 for insertion of a head of a bolt thereinto; the horizontal plate portion 2 continuing at right angles to a lower portion of the vertical plate portion 4, the horizontal plate portion having a horizontal wide opening 9 continuing to the opening 8, and a horizontal, narrow, notched hole 11, which is substantially U-shaped, continuing to the opening 9 via a sloping portion 10; and an wire-connecting portion (wire crimping portion) 12 continuing at right angles to an underside of the horizontal plate portion 2.

As shown in FIGS. 1 and 2, the vertical plate portion 4 includes: an upper horizontal connection portion 4a; right and left upstanding portions 4b; and ribs 4c each bent at right angles and rearward from corresponding each of the upstanding portions 4b so as to define a frame-like portion (4) which is substantially U-shaped.

The horizontal plate portion 2 includes: narrow plate portions 2a extending on both sides of the wide opening 9; a wide plate portion (U-shaped fork-like portion) 2b extending on both sides and along a rear portion of the notched hole 11; the pair of projecting pieces 3 each protruding in a fin-like manner on corresponding each of outer edges of the narrow plate portions 2a; and a rib 2c upstanding from an outer edge of the wide plate portion 2b.

The projecting piece 3 includes: a supporting portion 3a upstanding in a small degree and vertically, or substantially vertically, from the narrow plate portion 2a; and a principal portion 3b, which is substantially rectangular in plan view, extending horizontally from the supporting portion 3a. A curved sloping portion 3c is provided at a front-end portion of the principal portion 3b. As shown in FIG. 2, the projecting piece 3 is arranged such that projecting piece 3 is slightly lower than the rib 2c. The front-end portion 3c of the projecting piece 3 is positioned leaving a gap 13 at a lower rear edge of the rib 4c of the vertical plate portion 4. The front end of the rib 2c of the horizontal plate portion 2 is positioned at a rear edge of the projecting piece 3 with a small gap 14.

As shown in FIG. 1, the rib 2c of the horizontal plate portion 2 hangs down and continues to both sides of the wire-connecting portion 12, and upper right and left (or a pair of) press-fit pieces 12a of the wire-connecting portion 12 are swaged and connected to a conductor portion of the electric wire 15 for power supply or other purposes, and a lower pair of press-fit pieces 12b are press-fitted and secured to an insulating sheath of the electric wire 15. The orientation-related terms such as front, rear, right, and left are used for convenience of explanation in the specification.

As shown in FIG. 1, the junction box body 6 of this embodiment is a frame at an intermediate region in a height direction and includes a top over (not shown) covering a top opening of the frame 6 and a bottom cover 16 covering a bottom opening of the frame 6. The guiding portion 7 is provided in one piece with the frame 6 at an upper portion thereof for guiding the terminal 1 obliquely downward.

As shown in FIG. 3A (which is an enlarged view of the principal portion A in FIG. 1), the guiding portion 7 comprises: right and left (or a pair of) vertical wall portions 17; a guide-rail-like guiding wall 18 provided integrally with the pair of wall portions 17, defining a substantially flange-like shape along an inner surface of the pair of wall portions 17 so that a thick portion is constructed by the pair of wall portions 17 and the guiding wall 18; and a front-side (inlying side) vertical wall portion 19 connecting the right and left (the pair of) wall portions 17 to each other.

The guiding wall 18 has a sloping surface (guiding surface) 18a oriented obliquely downward, the sloping surface 18a being provided on an entrance's side (rear-end side) of the guiding wall 18. The right and left vertical wall portions 17 may open rightward and leftward, respectively, at the lower side of the guiding wall 18.

As shown in FIG. 3B, the sloping surface 18a is provided on lower-end surface of a latter-half of the guiding wall 18 within the range from the rear entrance of the guiding portion 7 to the both sides of the bolt 20, and the sloping surface 18a continues to the horizontal surface (guiding surface) 18 of a first-half of the straight lower-end surface of the guiding wall 18. A vertical distance H from the upper surface of the horizontal portion (represented by the reference sign 21) of the bus bar 21 arranged on a bottom surface of the guiding portion 7 to the horizontal guiding surface 18b of the guiding wall 18 is slightly larger than a height of the projecting piece 3 of the terminal 1. The bolt 20 is inserted downward into a hole 21a of the horizontal portion of the bus bar 21 to be brought into provisional locking with a lower-side nut (not shown) in the frame 6.

Figure 4A:
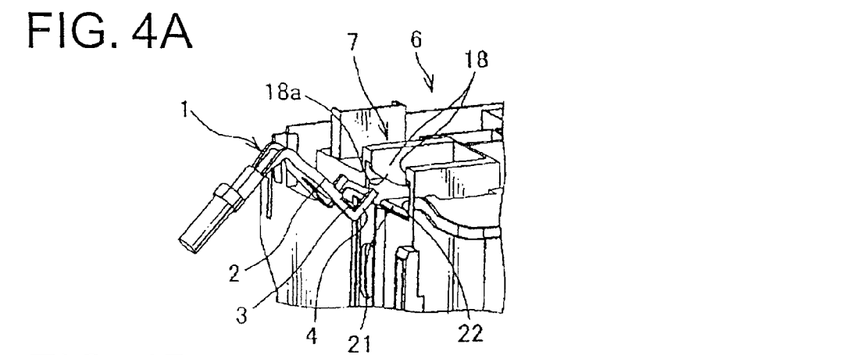
FIGS. 4A to 4D illustrate perspective views in stepwise states in which a terminal is mounted to an electrical junction box.
Figure 4B:
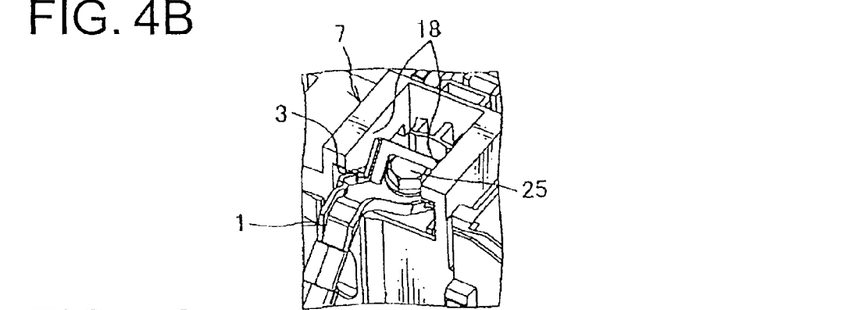

As shown in FIG. 4A, in a state where the terminal 1 is oriented obliquely downward, the terminal 1 is inserted into the rear opening 22 of the guiding portion 7 of the frame 6. As shown in FIG. 4B, upper surfaces of the right and left (or the pair of) projecting pieces 3 of the terminal 1 are smoothly slid on and along the sloping surface 18a at the entrance's side of the pair of guiding walls 18, and the terminal 1 is inserted obliquely downward into the guiding portion 7. The sloping surface 3c of the front end of the projecting piece 3 is inserted into the guiding portion 7 along the sloping surface 18a of the guiding wall 18 smoothly without being caught thereupon.

Figure 4C:
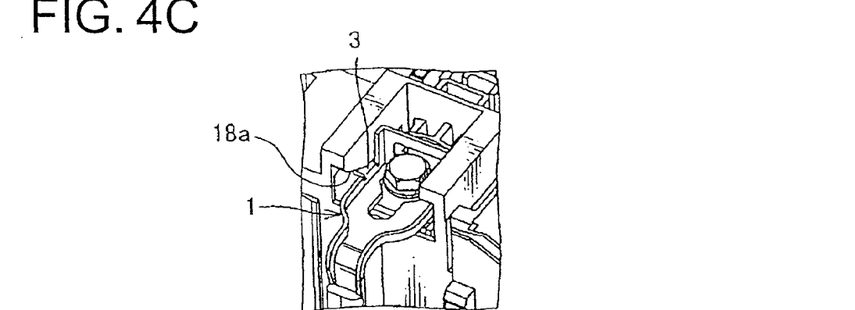
Figure 4D:
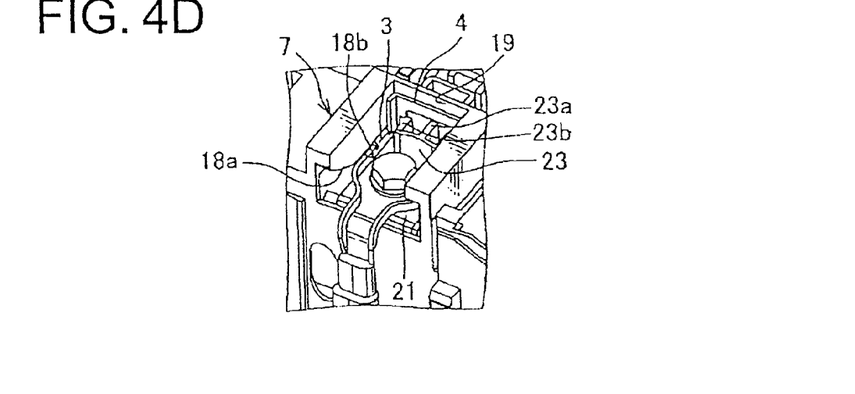

As shown in FIG. 4C, the upper surface of the projecting piece 3 advances via the sloping surface 18a of the guiding wall 18 along the straight horizontal surface 18b, and the terminal 1 is inserted automatically horizontally into the guiding portion 7. In this state, as shown in FIG. 4D, the terminal 1 is inserted horizontally into the guiding portion 7 to reach an innermost portion (front end) thereof, and the vertical plate portion 4 of the terminal 1 is brought into abutment on the inlying vertical wall portion 19, and at the same time, brought into locking with a proximal-side resilient locking portion 23, which is proximal relative to the wall portion 19. The sloping surface 3c on the front end of the projecting piece 3 is passed through a curved junctional portion 18c joining the sloping surface 18a and the horizontal surface 18b of the guiding wall 18, smoothly without being caught by the junctional portion 18c.

The locking portion 23 is the same one as in the conventional one shown in FIG. 7. and is comprised of a supporting plate portion 23a provided and suspended at the centre of the inlying wall portion 19; and a arm-like resilient nail portions 23b provided to the right and the left of the supporting plate portion 23a, respectively. The locking portion 23 and the head of the bolt 20 are inserted via the front opening 8 of the terminal 1 (FIG. 1). The nail portions 23b are brought into locking with the upstanding portions 4b (FIG. 1) at the right and left of the vertical plate portion 4. In this state, the bolt 20 is fully fastened, and thus the horizontal plate portion 2 of the terminal 1 is intimately connected to the lower-side bus bar 21.

The bus bar 21 is bent as it continues in the frame 6, and may be connected to a terminal (not shown) of a fuse, a relay, and/or a connector mounted on a top of the frame to provide electrical power to these components.

According to the above-described embodiment, even when the electrical junction box 5 is arranged at a less elevated position in the vehicle and an operator attaches the terminal 1 with the electric wire to the electrical junction box 5 from above and obliquely downward, the terminal 1 can be inserted, along the sloping surface 18a of the guiding wall 18 and the horizontal surface 18b continuing thereto, into the guiding portion 7 smoothly and effectively and with improved workability. Also, the pair of projecting pieces 3 of the terminal 1 release heat of the terminal 1 to outside. Further, for example, loosening of the wide crimping portion 12 of the terminal 1 is prevented, and reliability of electrical connection with respect to the electric wire 15 and reliability of power supply can be improved.

Figures 5A, 5B:
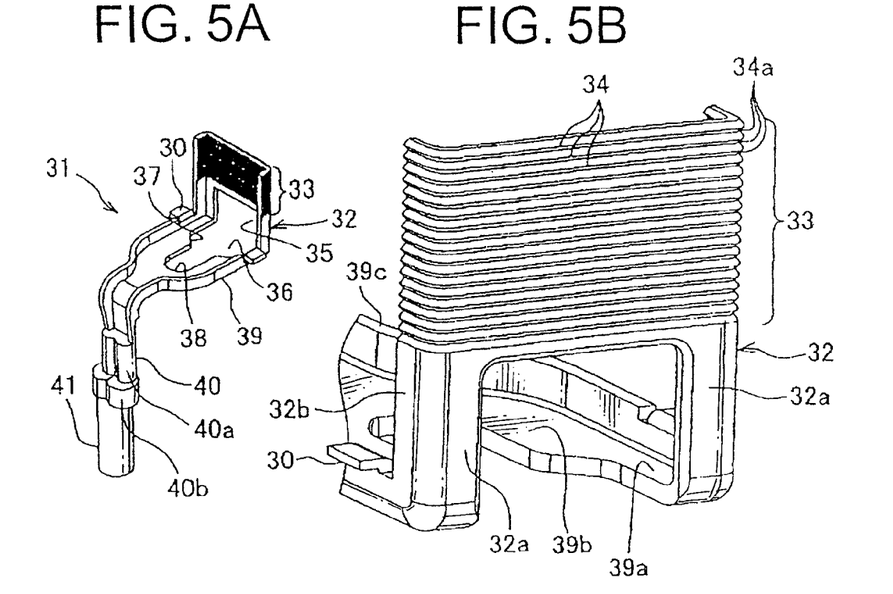
FIGS. 5A and 5B are a perspective view of a complete structure and a perspective view of a principal portion of a terminal in a terminal mounting structure in an electrical junction box according to another embodiment of the present invention, respectively.
Figure 6:
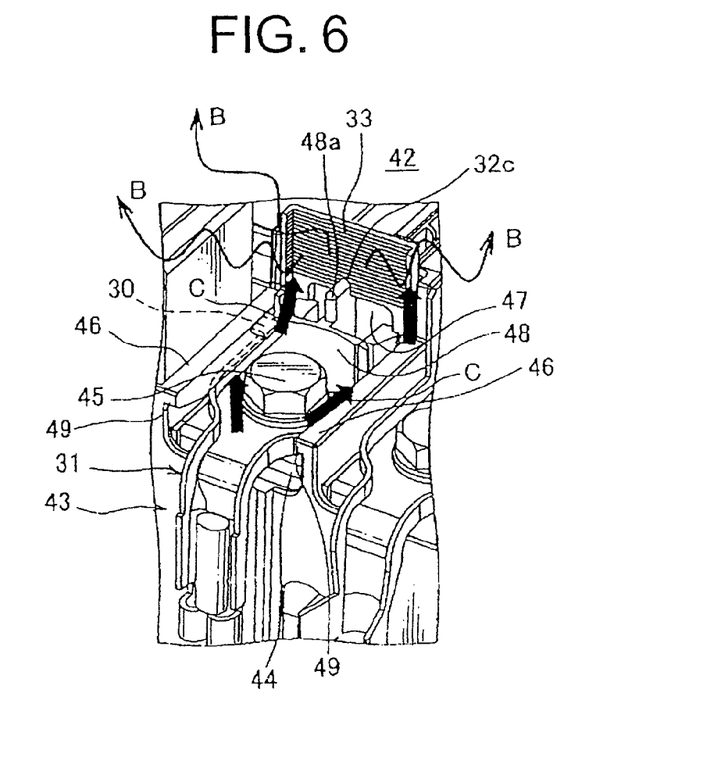
FIG. 6 is a perspective view of the terminal mounting structure of the above electrical junction box.

FIGS. 5 and 6 illustrate a terminal mounting structure of the electrical junction box according to a second embodiment of the present invention.

The structure is, in the same terminal mounting structure of the electrical junction box as in the embodiment shown in FIGS. 1 to 4, includes a heat release portion 33 constructed by upwardly extending the vertical plate portion 32 of the terminal 31, the heat release portion 33 having linear indentations 34 on its front and back surfaces to increase the surface area of the heat release portion 33 and thereby increase heat release effects of the heat release portion 33.

As shown in FIGS. 5A and 5B, the terminal 31 of this embodiment includes a vertical plate portion 32 having a rectangular wide opening 35 in which the bolt head is inserted; the heat release portion 33 extending from and in one piece with the vertical plate portion 32; a horizontal plate portion 39 having a wide opening 36, the horizontal plate portion 39 continuing at right angles to a lower portion of the vertical plate portion 32, and the wide opening 36 continuing to the opening 35, and a narrow substantially U-shaped notched hole 38 continuing to the opening 36 via a sloping portion 37; a pair of projecting pieces 30 protruding horizontally at the right and left of the horizontal plate portion 9; and a wire-connecting portion (wide crimping portion) 40 continuing at right angles to a lower portion of the horizontal plate portion 39.

The vertical plate portion 32 includes the heat release portion 33 which is a plate-like annexed portion provided upward with large height; an upstanding portion 32a integrally continues to a lower portion of the heat release portion 33; a rib 32b bent at right angles to and rearward from the heat release portion 33 and the respective upstanding portion 32a; so as to be a substantially U-shaped frame-like portion. The horizontal plate portion 39 includes narrow plate portions 39a provided at both sides of the wide opening 36; wide plate portions (U-shaped forked portion) 39b provided both sides as well as a rear portion of the notched hole 38; a rib 39c upstanding from an outer edge of the wide plate portion 39b; and the right and left projecting pieces 30.

The rib 39c of the horizontal plate portion 39 hangs down and continues to both sides of the wire-connecting portion 40, and upper right and left (or the pair of) press-fit pieces 40a of the wire-connecting portion 40 is swaged and connected to a conductor portion of an electric wire 41 for power supply or other purposes, and the lower-side right and left (or the pair of) press-fit pieces 40b are press-fitted and secured to an insulating sheath of the electric wire 41.

Thin grooves 34a, which extend horizontally with respect to the vertical connecting plate 33 and the ribs 32b on both sides of the connecting plate 33, are aligned in the vertical direction at regular pitches with a cross section in a shape of sawtooth or screw, so as to define the fine linear indentations 34. The indentations 34 may be readily provided by, in an extended state of the terminal 31 (i.e., a state in which the terminal 31 is punched out by a press out of an electrically conductive metal plate), strongly pressing the vertical plate portion 32 with waveform indentations (not shown) of a press die.

As shown in FIG. 6, an electrical junction box 42 has substantially the same configuration as in the embodiment illustrated with reference to FIGS. 1 to 4, and includes: a junction box body 43 made of insulating resin; a bus bar 44 extending along the junction box body 43; a nut (not shown) screwed onto a shaft of a bolt 45, the nut being provided at a lower side of a bolt insertion hole of a horizontal plate portion (also indicated by the reference sign 44) of the bus bar 44 in the junction box body; and a pair of vertical wall portions 46 in one piece with and upstanding from the junction box body 43 on both sides of the horizontal plate portion 39; a guiding wall 49 provided in one piece therewith inside of the pair of wall portions 46; an inlying vertical wall portion 47 adapted to connect the pair of wall portions 46 to each other and extending at a degree larger than that of the wall portion 46 and the guiding wall 49 so as to constitute the peripheral wall U-shaped in plan view; and a resilient terminal locking portion 48 provided in front of the vertical wall portion 47.

The vertical supporting plate 48a of the locking portion 48 is engaged with a notched slot 32c of the vertical plate portion 32 of the terminal 31 and defines positioning of the vertical plate portion 32. The right and left (or the pair of) projecting pieces 30 of the terminal 31 are guided along and inserted into the curved surface of the entrance's side of the guiding wall 49 to be positioned along the inlying horizontal surface.

The terminal 31 is inserted into a space under the pair of guiding walls 49 horizontally, and then the vertical plate portion 32 of the terminal 31 is brought into abutment on the inlying wall portion 47. In this state, the upper-side heat release portion 33 of the vertical plate portion 32 protrudes to a degree larger than the inlying wall portion 47 to be exposed to outside. A heat of the terminal 31 for power source connection or other purposes is released via the heat release portion 33 as indicated by the arrow B, and the heat of the terminal 31 is transferred toward the heat release portion 33 as indicated by the arrow C, and thereby the heat of the terminal 31 is decreased. The linear indentations 34 of the heat release portion 33 promote this cooling effect. Also, the right and left (or the pair of) projecting pieces 30 of the terminal 31 releases the heat of the terminal 31 to promote these cooling effects.

According to the embodiment shown in FIGS. 5 and 6, the terminal 31 can be secured and connected to the bus bar 44 by the bolt 45, and the heat caused in the terminal 31 due to power distribution is released from the heat release portion 33 to the outside of the terminal efficiently, and, by virtue of the indentations 34 of the heat release portion 33, this effect is further promoted, so that heating of the terminal 31 can be reduced and increase in energization current value for the terminal 31 can be achieved. Also, by virtue of the projecting pieces 3, the heat release portion 33, and the indentations 34, it is possible to improve both of assembling performance of the terminal 1 to the electrical junction box 5 and heat release performance of the terminal 1.

INDUSTRIAL APPLICABILITY

The present invention can be used in a structure for screw-tightening and connecting a terminal for power supply or other purposes to an electrical junction box to perform assembling smoothly even when the insertion direction of the terminal is obliquely oriented, to suppress heating of the terminal due to power supply and increase reliability of connection with the electric wire, and, as a whole, to increase attachability of so-called inclined tightening preventive terminal in the electrical junction box.

The invention claimed is:

1. A terminal mounting structure in an electrical junction box for mounting a terminal on the electrical junction box, the terminal being secured and connected via a bolt to a bus bar of the electrical junction box, the terminal having a vertical opening into which a head of the bolt is inserted and passed therethrough, and the terminal having a horizontal notched hole into which a shaft of the bolt is inserted, the terminal mounting structure comprising:

a pair of guiding walls provided on a junction box body, the guiding walls being opposed to each other and provided on both sides of the bolt, the guiding walls each having an entrance-side sloping surface, the sloping surface sloping from a top to a bottom of the guiding walls, and the guiding walls each having a straight horizontal surface continuing to the sloping surface, and the terminal having a pair of projecting pieces outwardly extending and configured to be slid on the sloping surface and then on the horizontal surface.

2. The terminal mounting structure as set forth in claim 1, wherein a heat release portion is provided in one piece with an upper portion of a vertical plate portion of the terminal having the vertical opening, a plurality of linear indentations are provided on a front surface and a rear surface of the heat release portion, the front surface and the rear surface of the heat release portion being exposed to outside.

* * * * *